Oct. 9, 1934.  J. K. RUSSELL  1,975,977
SPRING SUSPENSION FOR VEHICLES
Filed June 4, 1932  2 Sheets-Sheet 1
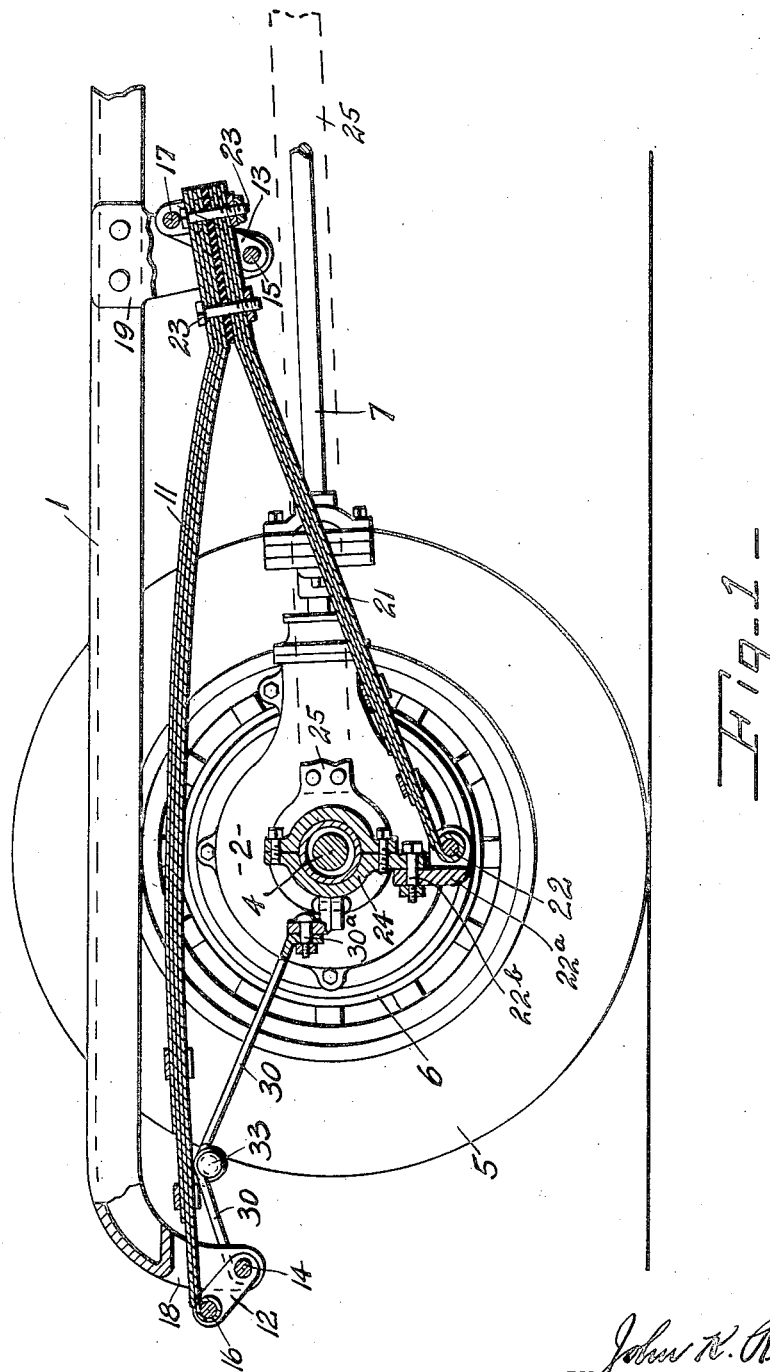
INVENTOR.
John K. Russell
BY Bodell & Thompson
ATTORNEYS.

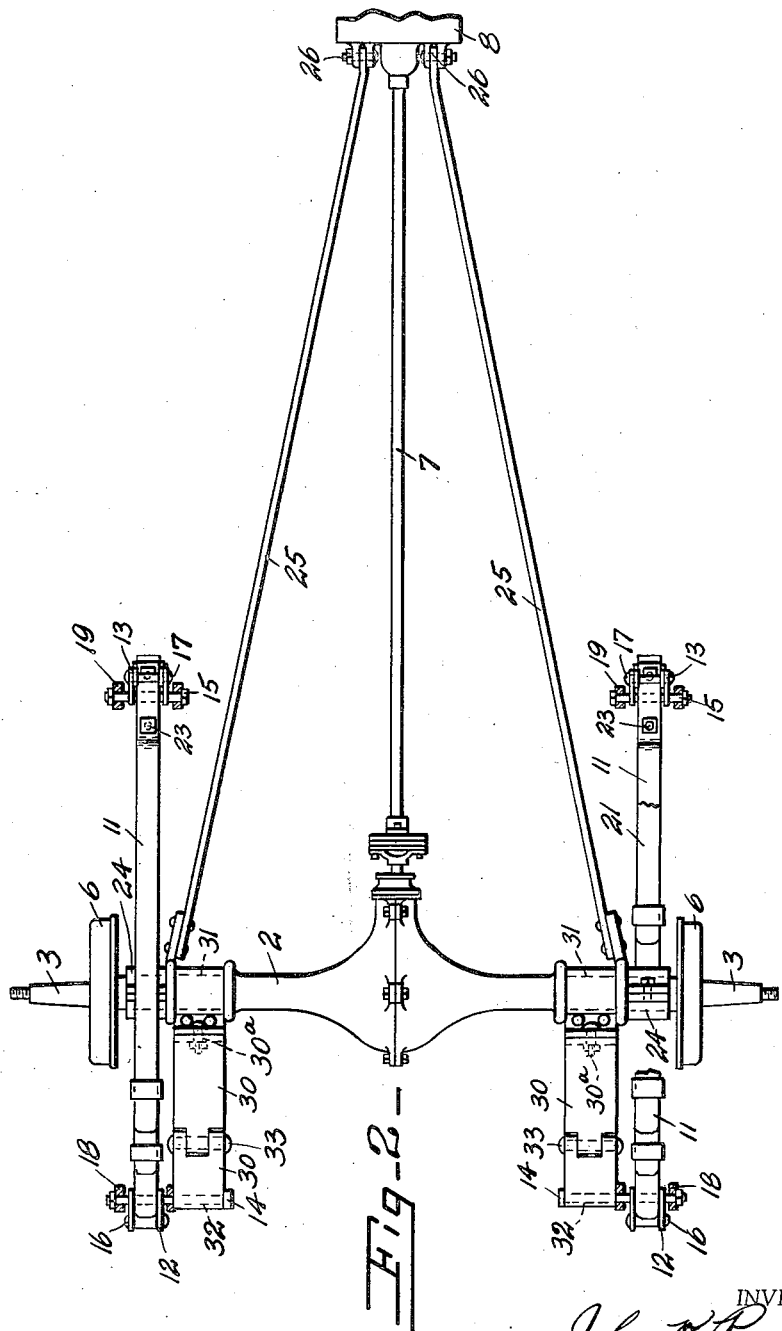

Patented Oct. 9, 1934

1,975,977

UNITED STATES PATENT OFFICE 1,975,977

SPRING SUSPENSION FOR VEHICLES

John K. Russell, Willard, N. Y.

Application June 4, 1932, Serial No. 615,397

2 Claims. (Cl. 280—106.5)

This invention relates to spring constructions or spring suspensions for motor vehicles and has for its object a simple spring arrangement by which the chassis or frame is supported from the axle with maximum flexibility or resiliency and the chassis relieved to a maximum from road shocks, or an arrangement by which the shocks received by the wheels or axle are not transferred to any appreciable extent through the springs to the chassis.

The invention consists in the novel features and in the combinations and constructions hereinafter set forth and claimed.

In describing this invention, reference is had to the accompanying drawings in which like characters designate corresponding parts in all the views.

Figure 1 is a fragmentary side elevation of a vehicle chassis embodying my invention.

Figure 2 is a fragmentary plan view of parts seen in Figure 1.

This spring arrangement comprises generally a unit at each side of the chassis or at each end of the axle, each unit including a leaf spring extending crosswise of the axle to the front and rear thereof and connected at both ends by shackles to the chassis or the sills thereof, this spring extending forward and rearward of the axle in a general horizontal direction and preferably above the same and a spring pivoted at one end of the axle and fixed at its other end to one end of the former spring, so that it is connected to the chassis through the shackle at one end of the former spring, and means for confining the movement of the axle to a vertical shifting movement or holding the axle from movement forward and rearward and axially.

This spring arrangement may be described as a three-quarters elliptical spring consisting of a semi-elliptical spring, which is connected to the chassis at both ends by shackles, and a quarter elliptical spring pivoted at one end to the axle and secured at its other end to one end of the semi-elliptical spring, so as to act in conjunction therewith.

I have here illustrated this spring arrangement as applied to the driving axle, usually the rear axle of a motor vehicle.

1 designates the sills of the chassis of a motor vehicle, 2 the housing of the driving axle; 3 the wheel spindles at the ends of the axle shaft sections as 4 journalled in the housing. 5 designates the wheels and 6 the brake drums. 7 is the propeller shaft and 8 the rear end of the transmission gear box.

All of the foregoing elements 1 to 8 inclusive may be of any suitable form, size and construction.

11 designates a leaf spring extending forwardly and rearwardly crosswise of and above each end of the axle near the sills, it extending substantially equal distances in front and rear of the vertical plane of the axis of the axle.

12 and 13 are spring shackles pivotally connected to the frame or sill at 14 and 15, and at 16, 17 to opposite ends of the spring 11, the shackles preferably inclining upward from the pivotal connection between them and the sill.

The shackle 12 is here shown as pivoted to a horn or down-turned end 18 at the rear end of each sill, and the shackle 13 as pivoted to lugs 19 depending from each sill. The spring 11 preferably bows upward and is in the nature of a semi-elliptical spring connected through shackles at its ends to the chassis.

21 designates a second spring pivotally connected at one end, as its rear end, at 22 to the axle housing 2 and connected at its front end to the chassis or the sill 1 through a shackle, and preferably, the shackle 13 is utilized to connect the front end of the spring 11 to the sill 1.

As here illustrated, the front end of the spring 21 is fixedly secured as by bolts 23 to the front end of the spring 11. The rear end of the spring 21 is pivoted to a bracket 24 depending from the axle housing 2, but being capable of lateral swinging movement to compensate for up and down movement of one end of the axle housing relative to the other, as when one road wheel drops into a road depression, or passes over a bump, and the other wheel does not. The spring 21 may be said to be one quarter elliptical. As shown, the pivot 22 of the spring 21 is carried at the lower end of a laterally swingable link 22a pivoted at 22b on an axis extending transversely of the axis of the axle. These links 22a incline inwardly out of the vertical to facilitate the movement thereof during the action of the springs. The bracket 24 is pivotally mounted on the axle housing to have a fore and aft movement, it being shown as having a bearing or collar about the housing.

The axle construction is held from forward and rearward shifting movement in any suitable manner, and as here shown by braces 25 pivoted at 26 to the gear box on an axis intersecting the axis of the universal joint between the propeller shaft 7 and the drive shaft of the gearing.

As the springs 11 are not fixed between their ends to the axle, and as the spring 21 is fixed to the chassis only at one end, means are provided for holding the axle and vehicle body from relative axial movement, that is holding the body from side sway. The means here illustrated consists of a pair of jointed braces 30 having thrust bearings at 31 on the axle housing near the ends thereof, the braces extending rearward and having bearings at 32 on the sills. As shown, the bearings 32 are on the pivots 14 of the shackles 12. Each brace is composed of sections, here shown as hinged together at 33 to permit the brace to shorten and extend during up and down movement of the axle. The up and down movement is in an arc of great radius, and is therefore in nearly a vertical line. These braces are of sufficient size and have sufficient bearing on the axle housing and the pivots 14 to hold the housing from axial movement. In order to compensate for relative up and down movement of one road wheel, or one end of the axle housing relative to the other, the braces 30 are pivoted at 30ª to the bearings 31 on vertical axes.

By this spring construction, the chassis frame is floatingly and resiliently carried and road shocks against the ground wheels are borne predominately by the springs 21 and not transferred to or felt in the chassis and the axle is in practical effect spring supported.

What I claim is:

1. The combination with a chassis and axle construction of a vehicle, of a spring construction for supporting the chassis from the axle comprising a unit which includes a leaf spring extending transversely of the axle above the same substantially equal distances forwardly and rearwardly from the vertical plane of the axle, the leaf spring being constructed to bow and flex upwardly and being free and unattached to the other parts between its ends, the unit also including a second leaf spring rigidly secured to one end of the former leaf spring and diverging downwardly therefrom and pivotally connected at its other end to the axle assembly below the axis thereof, shackles pivoted to the chassis and to opposite ends of the spring unit at the opposite ends of the first leaf spring, and means for holding the axle to a substantially vertical movement and preventing horizontal movement forward and rearward sufficient to permit the shackles to fold against the chassis and to brace the axle against axial displacement.

2. The combination with a chassis and axle construction of a vehicle, of a spring construction for supporting the chassis from the axle comprising a unit which includes a leaf spring extending transversely of and to the front and to the rear of the axle in a general forward and rearward horizontal direction and arranged to bow and flex away from the horizontal plane of the axle and being free and unattached to other parts between its ends, the unit also including a second leaf spring rigidly secured to one end of the former leaf spring and diverging in a vertical plane therefrom and pivotally connected at its other end to the axle assembly, shackles pivoted to the chassis and to opposite ends of the spring unit at the opposite ends of the first leaf spring, and means for holding the axle to a substantially vertical movement and preventing horizontal movement forward and rearward sufficient to permit the shackles to fold against the chassis and to brace the axle against axial displacement.

JOHN K. RUSSELL.